United States Patent [19]

Kenton

[11] 4,056,381
[45] Nov. 1, 1977

[54] FERTILIZER SOLUTIONS CONTAINING STABILIZED IRON

[75] Inventor: Joseph R. Kenton, Bartlesville, Okla.

[73] Assignee: Phillips Petroleum Company, Bartlesville, Okla.

[21] Appl. No.: 723,259

[22] Filed: Sept. 14, 1976

[51] Int. Cl.² .................................................. C05B 7/00
[52] U.S. Cl. .......................................... 71/36; 71/47; 71/63; 71/6 HC; 423/31 H
[58] Field of Search ................. 423/150, 305, 314; 71/1, 34, 36, 47, 63, 6 HC, DIG. 2

[56] References Cited

U.S. PATENT DOCUMENTS

| | | | |
|---|---|---|---|
| 2,837,418 | 5/1958 | Seymour | 71/39 X |
| 3,010,818 | 11/1961 | Jones et al. | 71/37 |
| 3,044,851 | 7/1962 | Young | 23/107 |
| 3,057,711 | 10/1962 | Reusser et al. | 71/43 |
| 3,076,701 | 2/1963 | Bersworth et al. | 71/43 |
| 3,113,858 | 12/1963 | Slack et al. | 71/42 |
| 3,244,500 | 4/1966 | Stinson et al. | 71/1 |
| 3,290,140 | 12/1966 | Young | 71/34 |
| 3,558,300 | 1/1971 | Wagner | 71/34 |
| 3,574,591 | 4/1971 | Lyons et al. | 71/36 X |
| 3,663,197 | 5/1972 | Backlund | 71/34 |
| 3,676,100 | 7/1972 | Knapsack et al. | 71/37 |
| 3,798,020 | 3/1974 | Parham, Jr. | 71/1 |
| 3,926,610 | 12/1975 | Kenton | 71/34 |

OTHER PUBLICATIONS

Crop Response to Iron Sulfate Applied with Fluid Polyphosphate Fertilizers, Mortvedt et al., TVA, Solutions Magazine, pp. 22-27, vol. 14.

Primary Examiner—Frank A. Spear, Jr.
Assistant Examiner—Ferris H. Lander

[57] ABSTRACT

Stable fertilizer solutions containing nitrogen, phosphorus, and iron, are prepared by admixing an iron-containing component with an ammonium phosphate-containing solution, and thereafter treating the resulting product with ammonia, thereby resulting in a stabilized iron product.

15 Claims, 6 Drawing Figures

FERTILIZER SOLUTIONS CONTAINING STABILIZED IRON

FIELD OF THE INVENTION

The invention pertains to stabilized-iron fertilizer solutions, and methods of preparing same.

BACKGROUND OF THE INVENTION

Iron is one of the micronutrients required by growing plants. Iron is necessary for the production and synthesis of chlorophyll, and for the activation of various enzyme systems. Iron deficiency or what is frequently termed iron chlorosis is most common on alkaline soils in the Western United States. Such a condition results in decreased crop yields, and even results in the death of plants. According to one estimate, at least about 5 percent of the cultivated land west of the Mississippi River is considered iron deficient. Actually, this iron deficiency may not really be caused by a lack of iron in the soil, but rather more precisely from the relatively low solubility of the iron compounds that are present.

Correction of soil iron deficiency with inorganic iron compounds is very difficult, since such are generally quickly converted to insoluble compounds wherein the iron is substantially unavailable to the plant itself. Chelated iron compounds can correct a soil iron deficiency, but the cost of application is prohibitive for most crops, so that such generally are suitable only for specialized small area purposes such as house plants and the like.

Efforts have been made in the past to provide a stabilized-iron high nitrogen high phosphorus fertilizer solution. Relatively small amounts of iron are needed, and it would be convenient to be able to apply it along with the major fertilizer components. Unfortunately, efforts heretofore have simply resulted in materials that have either had large quantities of iron sludge and thus have been difficult to apply, the sludge clogging the feeding equipment, and not providing a source of usable soluble iron for the plants, or the admixtures heretofore prepared have turned into solid gels shortly after preparation, substantially precluding suitable application to the plants.

So far as I am aware, there simply is no commercially available source of stabilized solubilized iron which is effective and yet economical for use on crops.

Thus, it is an objective of my work to develop stable iron-containing solutions suitable for use in correcting soil iron deficiencies. Higher concentrations of iron, usable in the context of a fertilizer formulation, require less liquid per acre to achieve the desired results. Thus, a further objective is to develop a system containing as high a concentration of iron as possible, preferably in conjunction with a high nitrogen high phosphorus containing material.

BRIEF SUMMARY OF THE INVENTION

In accordance with my invention, stabilized-iron solubilizediron substantially solids-free highnitrogen high phosphorus fertilizer solutions are prepared by contacting a water-soluble iron compound, ammonium polyphosphate, and water, thus producing an iron ammonium polyphosphate slurry. The resulting slurry is contacted with ammonia in a sufficient quantity to result in a stable solubilized-iron complex in solution. The solubilized iron complex containing solution remains suffficiently stable that it can then be diluted to a lower concentration, where desired, with an ammonium polyphosphate solution.

BRIEF DESCRIPTIONS OF THE DRAWINGS

FIG. 1 is a brief schematic showing a generalized procedure suitable for preparing the stabilized solubilized iron-nitrogen-phosphorus substantially solids-free solutions which I have discovered. A water-soluble iron compound 1, and water 2, are fed to a dissolving tank 4, preferably equipped with a mixture 5, and a drain 6 to allow for settling and removal of any undissolved sludge. Alternatively, a pre-prepared concentrated solution of an iron compound can be fed 3 to the mixing tank 4. The iron compound solution of strength desired for preparation of the compositions of my invention can be transferred 7 to a reactor 8 preferably equipped with a stirrer 9. In reactor 8, the iron compound solution is contacted with an ammonium polyphosphate solution supplied 11 from a holding tank 12. After suitable reaction to form the iron complex slurry, ammonia is supplied 13 from a holding tank 14 to complete preparation of the substantially solids-free stabilized-iron solutions of my invention. Since these reactions are exothermic, the ammonia can be fed 13 to the reactor 8 via a heat exchanger 15 to provide cooling of the stabilized product as it is taken 16 for transfer to a holding tank 17 for the iron complex.

Figure 6:
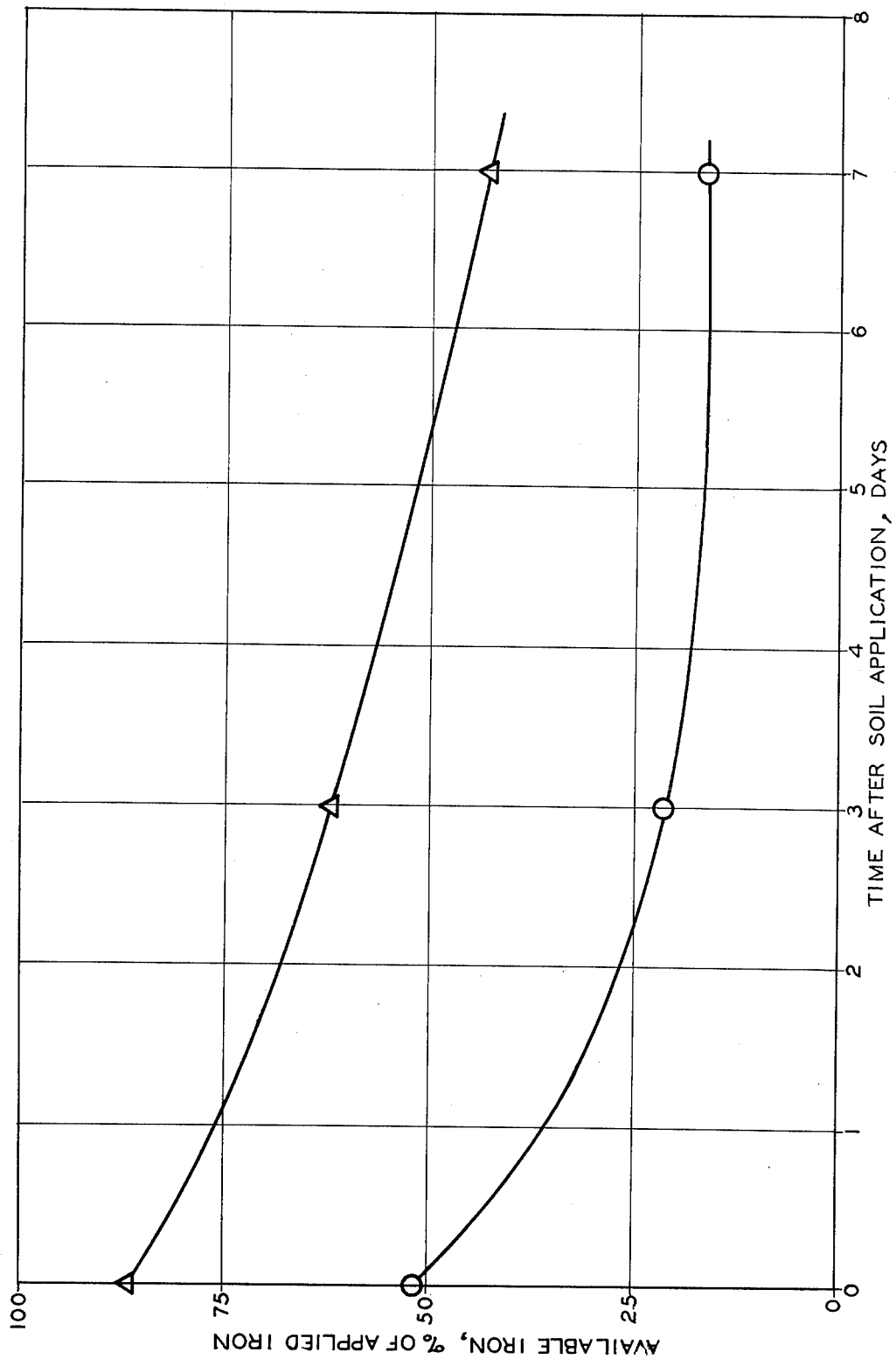

FIG. 6 plots available iron versus contact time in the soil as days after application to the soil, showing two different application levels of my iron complexes. These curves demonstrate the extended availability of the iron to the plants utilizing the products in accordance with my invention. Each of the complexes employed was prepared in accordance with my invention by mixing 200.00 g 10-34-0 and 219.71 g of an aqueous ferric sulfate solution containing 15.16 weight percent ferric ion, mixing the resulting slurry with 150.02 g of ammonium hydroxide (29 weight percent $NH_3$), mixing the resulting product with 415.68 g of 10-34-0 to prepare 985.41 g of fertilizer mixture, diluting a 1-g sample or a 4-g sample, respectively, of the resulting mixture with deionized water to give 100 g of solution, 29.59 g of which was diluted with deionized water to give 100 g of solution, 0.40 g of which was mixed with 9.6 g of soil.

DETAILED DESCRIPTION OF THE INVENTION

A high nitrogen high phosphorus substantially solids-free stabilized-iron solution in accordance with my invention is prepared in a process comprising two basic steps.

A water-soluble iron salt and an ammonium polyphosphate are admixed, together with sufficient water, which may include water of hydration, so as to provide a resulting product in the form of a slurry. The water can be in part supplied by one or more of water of hydration of the salts, by added water, or by water with the salts where same are in preformed solution. Although at this point the order of addition does not appear critical, for ease of handling and mixing it is presently preferable to add the ammonium polyphosphate to a concentrated aqueous solution of the water-soluble iron salt. While the dry solids can be admixed with water, for ease of handling it is much to be preferred that the ammonium polyphosphate be used as a relatively concentrated aqueous solution thereof, which then is admixed with or into an aqueous solution or slurry of the water-soluble iron salt.

The ratio of phosphorus atoms to iron atoms in the first step in the procedure in accordance with my invention should be at least about 1:1. A suitable working ratio exemplarily can be considered to be in the range of about 1:1 to 100:1, phosphorus atoms:iron atoms, and preferably and conveniently within the range of 1:1 to 10:1. The particular choice will depend in part on the nature of the water-soluble iron salt employed, since it can be determined from the trilinear graphs herein attached, there is a considerable difference in the amount of iron that can be achieved as a stable complex depending on the particular salt chosen. The trilinear graphs are attached to help guide those skilled in the art.

For most purposes, a phosphorus/iron atom ratio of about 1:1 proves suitable, though this can vary upwardly as I have discussed. Excessively high P:Fe atom ratios sometimes result in relatively solid iron phosphate gels which are difficult to stir, though these normally provide suitable solutions upon addition of ammonia in the second step. However, if too much iron is present, such that the ratio of phosphorus atoms:iron atoms is less than about 1:1, iron hydroxide gels generally form when the iron phosphate slurry is contacted with the ammonium hydroxide, and these generally are stable gels unsuitable for plant applications, aside from being very difficult to apply to say the least.

The resulting admixture or slurry from the first step is admixed with ammonia in an amount sufficient to result in my substantially solids-free stable iron complex solutions. Again, although the order of addition does not appear to be critical at this stage, for ease of handling and product control it presently is considered preferable to add the product from the first step into the ammonia. The ammonia can be anhydrous or a strong aqueous solution.

In the second step, the amount of ammonia added can be based on the number ratio of ammonia molecules to iron atoms, which number ratio should be in the range of at least about 3:1, preferably about 3:1 up to 240:1, more preferably at present in the range of about 3.5:1 to 30:1. The ratio chosen again will depend in part on the nature of the water-soluble iron salt employed and the amount of water used in each of the several steps.

In general, when a properly prepared iron phosphate slurry is added to the correct amount of ammonium hydroxide, a soluble iron complex is readily formed, and a presently most preferred ratio is of the order of about 4 molecules of $NH_3$ per atom of Fe. If insufficient amounts of ammonium hydroxide are added, a solids-free solution cannot be obtained.

The pH range of the stabilized, solubilized, high nitrogen, high phosphorus iron complex solution preferably is about 8 to 9.7. In commercial production, pH control is the simplest method for determining the correct amount of ammonia or ammonium hydroxide to be added.

If desired, further ammonium polyphosphate solution can be added at this stage provided that the amount of ammonium polyphosphate initially incorporated in the first step was sufficient to provide at least about one atom of phosphorus per atom of iron. Thus, after forming of the soluble iron complex solution by contacting with the ammonia, additional ammonium polyphosphate solution can be incorporated to produce a standardized iron complex solution with desired amount of iron for a particular soil application. Once the solubilized stable iron complex is formed, it can easily be blended with or mixed with additional ammonium polyphosphate solution, such as additional 10-34-0, so as to prepare formulations containing specific amounts of iron to meet specific crop requirements.

Thus, my procedure essentially comprises preparing a solubilized iron complex by reacting an ammonium polyphosphate aqueous solution, typically such as a commerical fertilizer formulation designated as 10-34-0, with an iron compound preferably as an aqueous solution thereof, and then reacting this iron polyphosphate-containing product slurry with ammonia or ammonium hydroxide sufficient to produce a stabilized iron complex solution which is substantially solids-free, stable on storage without precipitation of the iron, and stable on storage without the formation of gel. It is important that this two-step reaction sequence be followed, otherwise an insoluble iron hydroxide gel will be formed.

The admixing can be conducted in any suitable equipment, such as stainless steel of type 304 or 316, glass-lined, or othewise, or glass-lined iron. Materials suitable for handling high phosphorus high nitrogen fertilizer solutions, and the potentially corrosive iron salt solutions, are well known in the art and need not be further described. Equipment to handle gaseous ammonia, liquid ammonia, ammonium hydroxide, and the like, also are well known in the art and need not be further detailed here, suffice to say that the equipment employed should be resistant to corrosion from iron-containing solutions, and strong ammonia-containing solutions.

Cooling is important, since reaction of an iron compound solution with the ammonium polyphosphate solution to produce the iron polyphosphate-containing slurry is exothermic, and the further reaction with ammonia also is exothermic. Exposure of the iron polyphosphate-containing slurry to heat, particularly in an acidic environment prior to the addition of the ammonia, would increase the rate of reversion of polyphosphates to orthophosphates and decrease the yield of or concentration of soluble iron complex that can be prepared. Cooling is necessary to avoid reversion of the polyphosphate, and also to avoid loss of water and/or ammonia from the slurry and/or solution of iron complex obtained therefrom.

AMMONIUM POLYPHOSPHATE

In references to the ammonium polyphosphate above, it is intended that the term cover broadly molecularly dehydrated phosphates known commonly as "polyphosphates," and herein as the ammonium salts thereof. In commercial practice, such ammonium "poly" phosphates are not necessarily of a particular defined structure, though such may be true in the case of such as the tetrapolyphosphate, pyrophosphate, tripolyphosphate, and the like. Also, commercial polyphosphate solutions frequently contain varying proportions of orthophosphate, which in the practice of my invention is not objectionable, so long as at least a minimum amount of true "poly" phosphate is present.

In a suitable ammonium polyphosphate, at least about 20 percent, and preferably at least about 35 percent, and more preferably at present at least about 45 weight percent, of the phosphorus atoms are in the form of polyphosphate, which can be pyrophosphate, tripolyphosphate, tetrapolyphosphate, and the like. Typically, a suitable ammonium polyphosphate is produced by neutralization of polyphosphoric acid with ammonia, usually with sufficient water present to provide an aqueous solution of the ammonium polyphosphate containing of the order of about 30 to 50 weight percent water, the balance substantially ammonium phosphate of high "poly" content. In such an ammonium polyphosphate solution, about 45 to 80 percent of the phosphorus atoms present are in the form of a polyphosphate, the remainder being present as orthophosphate.

Commerical ammonium polyphosphate solutions frequently are designated by terms such as "10-34-0" which refers to the nitrogen as N, phosphorus as $P_2O_5$, potassium as $K_2O$ on a weight percent basis. Broadly, the commerical ammonium polyphosphate solutions are high-N products containing about 9 to 11 weight percent N and 30 to 37 weight percent $P_2O_5$. Typically available ammonium polyphosphate compositions are 10-34-0, 11-37-0, 9-30-0, and the like. At present, an aqueous solution having a minimum concentration of about 50 weight percent total ammonium phosphates, including ammonium polyphosphates and ammonium orthophosphate, are preferred for admixture with the iron-containing compound.

At present, for convenience, it is preferred that the iron compound be admixed with the ammonium polyphosphate solution either as the solid, which can be hydrated or anhydrous, or as an aqueous solution of high concentration.

WATER-SOLUBLE IRON SALTS

Broadly, water-soluble iron salts are suitable in the process in accordance with my invention to prepare the iron complexes in accordance with my invention.

Among the typically suitable water-soluble iron salts are ferrous acetate, ferrous bromide, ferric bromide, ferrous choride, ferric chloride, ferric formate, ferrous iodide, ferric lactate, ferric malate, ferrous nitrate, ferric nitrate, ferric oxalate, ferric sulfate, ferrous sulfate, ferrous thiosulfate, or mixture thereof. The iron salt can be used in anhydrous or hydrated form.

It is to be noted that those iron complex solutions prepared incorporating an iron sulfate as a source of iron also thus provide sulfur, desirable in many instances for crop applications also.

AMMONIA

Ammonia useful in the process of my invention can be in the anhydrous form, or can be employed as an aqueous solution, preferably of a concentrated nature. Commercially available ammonium hydroxide containing an ammonia content of about 28 to 30 weight percent $NH_3$ is quite suitable. It is less desirable, if aqueous solutions are employed, to use those with a content of ammonia of less than about 20 weight percent since this may result in excessive dilution of the iron phosphate product prepared in the first stage.

If desired, a fully balanced fertilizer solution further containing potassium can be prepared. A potassium phosphate can be added, most preferably as the potassium dibasic orthophosphate or potassium tribasic orthophosphate, which are more soluble in water than the potassium monobasic orthophosphate; or as a potassium polyphosphate. A desired amount of a potassium phosphate can be dissolved in water and added to the stabilized iron complex solution. Potassium phosphates are readily soluble in water, though as mentioned the dibasic or tribasic orthophosphates are generally more soluble. Concentrated potassium-containing solutions can be made up and blended with the stabilized iron complex solutions so as to prepare solutions suitable for particular applications.

EXAMPLES

Examples provided are intended to be of assistance to one skilled in the art in a further understanding of my invention. Examples provided, particular components employed, ratios, relationships, conditions, and the like, are intended to be exemplary, and not limitative of the scope of my disclosure which incorporates not only these examples, but the preceding descriptive portions, and the claims.

EXAMPLE I

In general, the procedure employed in the various runs was to react an ammonium polyphosphate aqueous solution, a liquid fertilizer of 10-34-0 composition, with each of various iron salts as an aqueous solution of the iron compound; and then react this iron polyphosphate product with ammonia as ammonium hydroxide. Preparations were conducted in glass or stainless steel reactors, equipped with means for agitation.

A typical preparation involved adding 1.423 g (67.7 weight percent) of a 55 weight percent aqueous solution of commercial partially hydrated ferric sulfate (Ferri-Floc from Cities Service containing about 20 weight percent iron expressed as $Fe^{+3}$) containing about 11.54 weight percent $Fe^{+3}$ to a one-gallon Waring blender, to which was then added 677 g (32.3 weight percent) of 10-34-0 to the stirred ferric sulfate solution. The reaction was slightly exothermic. The resulting gray-colored iron phosphate slurry was then poured into a glass bottle and cooled to room temperature in an ice water bath.

187 Grams (27.22 weight percent) of ammonium hydroxide (containing 21 weight percent $NH_3$) was added to a 1-liter Waring blender, and to this was then added 500 g (72.78 weight percent) of the iron phosphate slurry. The reaction was exothermic. Small batches were prepared so that the product could be quickly cooled in an ice water bath. A total of 2,748 grams of material was prepared. The formulation corresponded to 23.46 weight percent 10-34-0, 49.32 weight percent of 55 weight percent Ferri-Floc solution, and 27.22 weight percent ammonium hydroxide (21 percent $NH_3$), and the formulation had a calculated composition of 7.05-7.98-0-5.69 Fe-4.89 S.

Similar preparations were employed using ferrous chloride, ferric chloride, and ferrous sulfate. Results of exemplary runs are summarized in Tables below. In view of the many runs involved, data also are summarized by means of the attached trilinear graphs.

TABLE I

Figure 1:
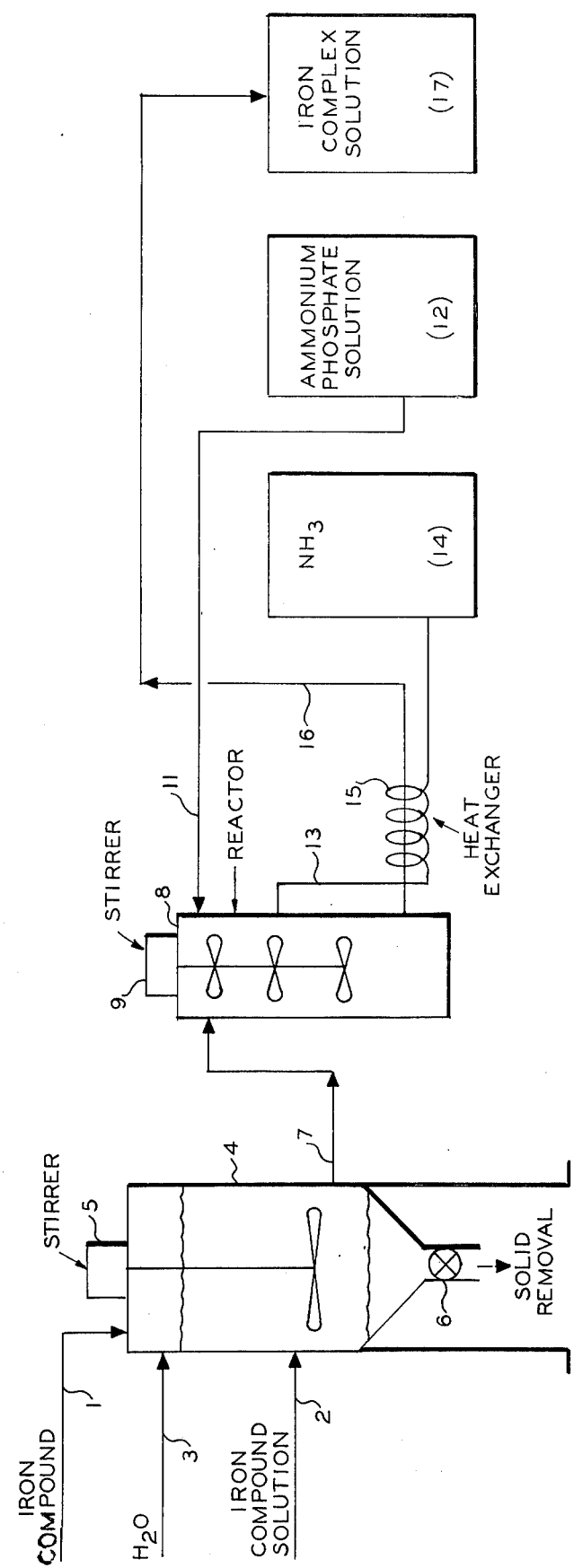
Figure 2:
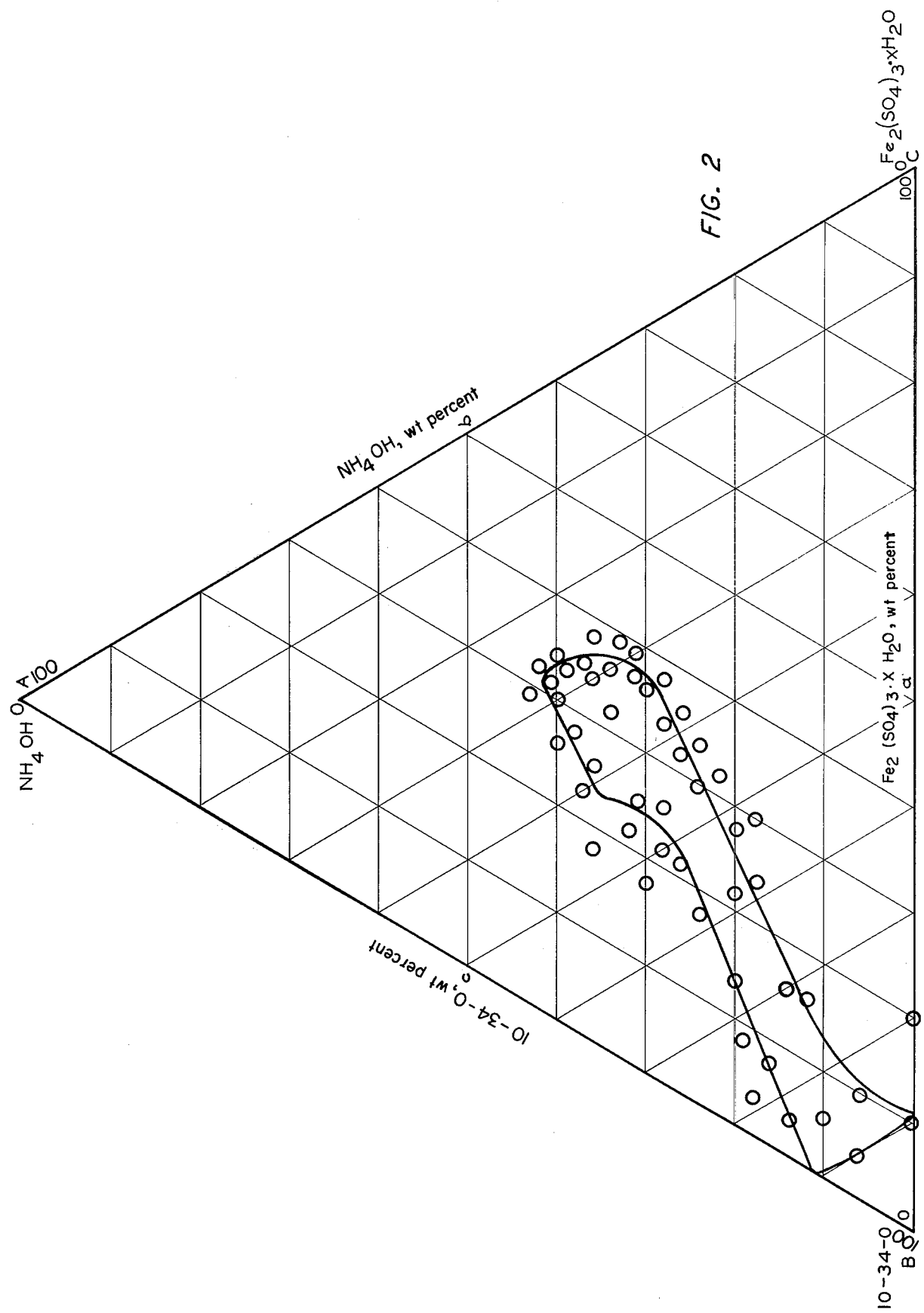
FIG. 2 is a trilinear graph plotting ammonium hydroxide A versus 10-34-0 ammonium polyphosphate solution B versus hydrated ferric sulfate C in the formulations, with those compositions inside of the oddly shaped perimeter representing those solutions which were stable and substantially solids-free. The 10-34-0 refers to weight percent nitrogen as N-phosphorus as $P_2O_5$-potassium as $K_2O$.

| | Comparison of Trilinear Phase Diagrams | | | | | | | |
|---|---|---|---|---|---|---|---|---|
| Phase Diagram | Ferrous Chloride | Ferric Chloride | Ferrous Sulfate | Ferric Sulfate | % Active Ingredient | % $H_2O$ Added | Temp. °C | Maximum % of Soluble Iron |
| FIG. 2 | X | | | | 24 | 76 | 26 | 0.50 |
| 3 | | X | | | 20 | 80 | 26 | 1.2 |
| 4 | | | X | | 50 | 50 | 25 | 1.4 |
| 5 | | | | X | 100 | 0 | 25 | 5.9 |

Preparation of a Trilinear Graph Showing One Phase Area in the System 10-34-0/$FeCl_2$.$4H_2O$/$NH_4OH$ These runs gathered solubility data on the system 10-34-0/$FeCl_2$ . $4H_2O$/- $NH_4OH$ at room temperature (26° C.). A trilinear graph showing the area having a homogeneous liquid phase was then prepared (FIG. 2).

A solution of ferrous chloride was prepared containing 0.50 g of $FeCl_2.4H_2O$ per gram of solution. One gram of solution contains 0.1405 g $Fe^{+2}$.

The procedure was to weigh the 10-34-0 into a screw cap vial and dilute it with 15 g of distilled water. The solution was agitated to mix it. The $FeCl_2.4H_2O$ solution was added and mixed. Ammonium hydroxide was added and the mixture was shaken vigorously and the results observed. Final mixture weight was 20 g.

TABLE II - FIG. 2

| Formulation No. | Wt. % 10-34-0/$FeCl_2$.$4H_2O$/$NH_4OH$ Solution | Composition, Wt. % N-$P_2O_5$-$K_2O$-Fe | Comments |
|---|---|---|---|
| 1 | 84/ 2/14 | 2.9-7.1-0-0.07 | Clear liquid |
| 2 | 84/ 3/13 | 2.9-7.1-0-0.11 | Hazy liquid |
| 3 | 78/ 3/19 | 3.1-6.6-0-.10 | Clear liquid |
| 4 | 70/ 6/24 | 3.2-5.95-0-.21 | Clear liquid |
| 5 | 70/ 7/23 | 3.1-5.95-0-.25 | Hazy liquid |
| 6 | 60/10/30 | 3.3-5.1-0-.35 | Clear liquid |
| 7 | 60/14/26 | 3.1-5.1-0-.49 | Precipitate present |
| 8 | 50/14/36 | 3.4-4.25-0-.49 | Clear liquid |
| 9 | 50/18/32 | 3.2-4.25-0-.63 | Precipitate present |
| 10 | 40/10/50 | 4 - 3.40-0-.35 | Clear liquid |
| 11 | 40/14/46 | 3.75-3.40-0-.49 | Precipitate present |
| 12 | 30/10/60 | 4.3-2.55-0-.35 | Clear liquid |
| 13 | 30/14/56 | 4.1-2.55-0-.49 | Precipitate present |
| 14 | 20/10/70 | 4.7-1.70-0-.35 | Clear liquid |
| 15 | 20/14/66 | 4.4-1.70-0-.49 | Precipitate present |
| 16 | 10/10/80 | 5 - .85-0-.35 | Clear liquid |
| 17 | 10/14/76 | 4.8-.85-0-.49 | Precipitate present |
| 18 | 4/ 6/90 | 5.5-.34-0-.21 | Clear liquid |
| 19 | 4/10/86 | 5.2-.34-0-.35 | Precipitate present |
| 20 | 1/ 2/97 | 5.8-.09-0-.07 | Precipitate present |
| 21 | 2/ 2/96 | 5.8-.17-0-.07 | Clear liquid |

The following runs are typical of those employing ferric chloride:

TABLE III

| Iron Complex Formulations Prepared from Ferric Chloride, 10-10-34-0 Liquid Fertilizer and Ammonium Hydroxide | | | | | |
|---|---|---|---|---|---|
| Formulation | | | | | |
| 10-34-0 Wt. % | $FeCl_3$ . $6H_2O$, 54% Solution, Wt. % | $NH_4OH$, Wt. % | Added $H_2O$, Wt. % | Composition N-$P_2O_5$-$K_2O$-Fe, Wt.% | Comments |
| 12.5 | 9.2 | 7.5 | 70.8 | 3.0-4.3-0-1.0 | Liquid |
| 25.0 | 18.5 | 15.0 | 41.5 | 6.1-8.5-0-2.1 | Liquid |
| 27.3 | 26.3 | 13.1 | 33.3 | 5.9-9.3-0-2.9 | Liquid |
| 37.5 | 27.8 | 22.5 | 12.2 | 9.1-12.8-0-3.1 | Liquid |
| 73.3 | 18.3 | 8.4 | — | 9.3-14.9-0-2.0 | Liquid |
| 42.7 | 31.7 | 25.6 | — | 10.4-14.5-0-3.5 | Contained crystals |
| 45.0 | 32.9 | 22.1 | — | 9.8-15.3-0-3.7 | Liquid |
| 41.2 | 38.2 | 20.6 | — | 9.1-14.0-0-4.3 | Liquid |
| 36.6 | 40.7 | 22.7 | — | 9.1-12.4-0-4.5 | A slurry |

Figure 3:
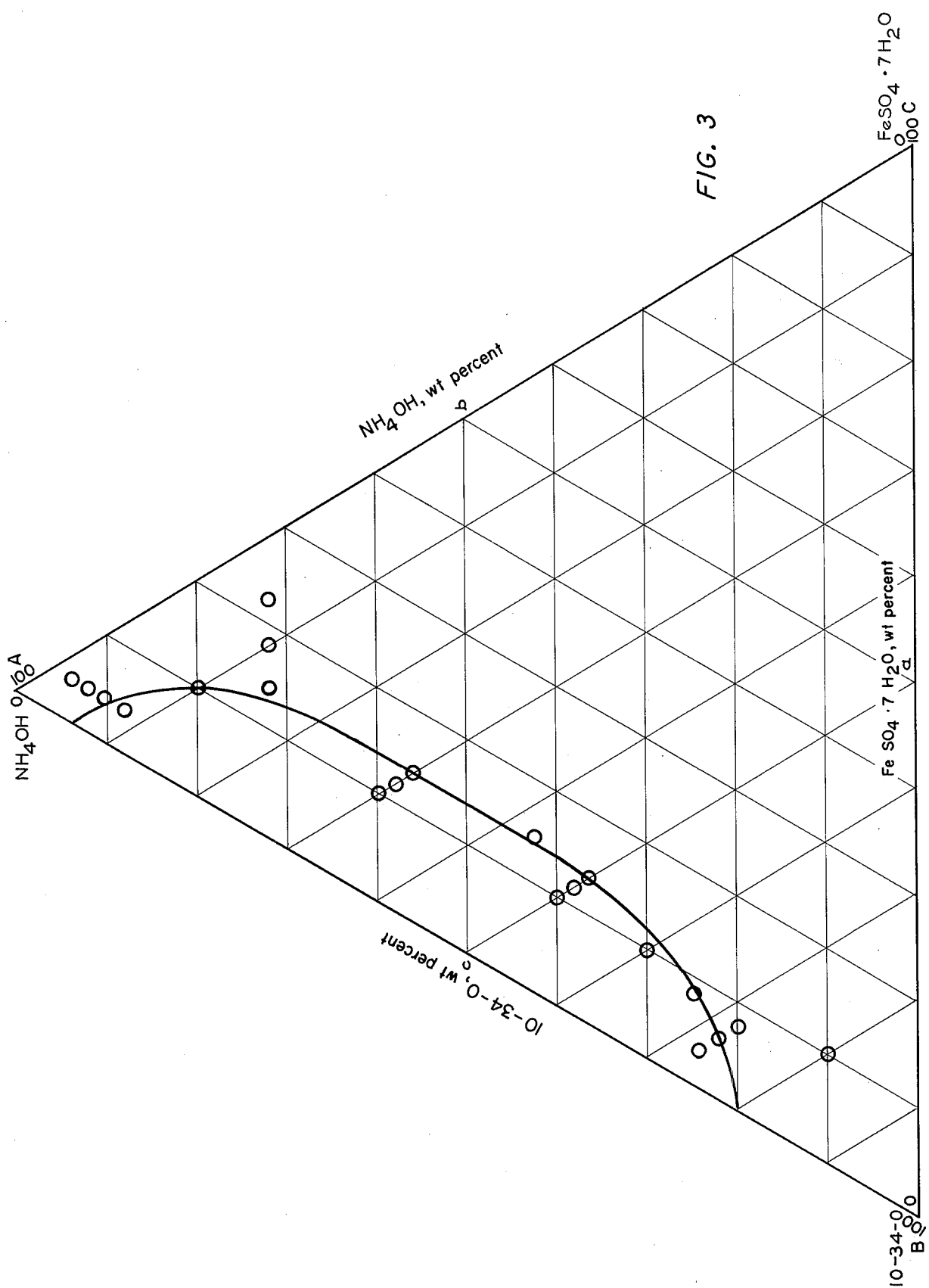
FIG. 3 is a trilinear graph of ammonium hydroxide A versus ammonium polyphosphate solution 10-34-0 B versus hydrated ferrous sulfate C, with those compositions within the smaller portion of the trilinear graph representing those compositions which were stable and substantially solidsfree.

Preparation of a Trilinear Graph Showing One Phase Area in the System 10-34-0/$FeCl_3.6H_2O$/$NH_4OH$ Further runs were made to gather solubility data on the system 10-34-0/$FeCl_3.6H_2O$/$NH_4OH$ at room temperature (26° C.). A trilinear graph to show the area having one homogeneous liquid phase was then prepared (FIG. 3).

A $FeCl_3.6H_2O$ solution was prepared having 1.35 g of $FeCl_3.6H_2O$ per 3.0 g of solution or 0.0930 g $Fe^{+3}$ per g of solution.

The procedure was to weigh the 10-34-0 into a screw cap vial and dilute it with the calculated amount of distilled water. The $FeCl_3$ solution was added and the mixture was agitated vigorously. Ammonium hydroxide (29 wt.% $NH_3$) was added, shaken vigorously, and results observed. 5 G (total) of active ingredients (10-34-0, $FeCl_3.6H_2O$ (solid), and $NH_4OH$) were used in each formulation and each was diluted to 25 g with deionized water.

An aqueous solution was prepared containing 0.40 g of $FeSO_4.7H_2O$ per gram of solution. One gram of solu-

TABLE IV - FIG. 3

| Formulation No. | Wt. % Solid 10-34-0/FeCl$_3$.6H$_2$O/NH$_4$OH | Composition, Wt. % N-P$_2$O$_5$-K$_2$O-Fe | Comments | pH |
|---|---|---|---|---|
| 1 | 90/ 0/10 | 2.3–6.1–0–0 | Clear liquid | |
| 2 | 90/10/0 | 1.80–6.1–0–.41 | Precipitate present | |
| 3 | 84/ 6/10 | 2.2–5.7–0–.25 | Clear liquid | |
| 4 | 84/ 8/8 | 2.1–5.7–0–.33 | Clear liquid | |
| 5 | 84/10/6 | 2 – 5.7–0–.41 | Ppt. present | |
| 6 | 80/10/10 | 2.1–5.4–0–.41 | Clear liquid | |
| 7 | 70/20/10 | 1.9–4.8–0–.83 | Ppt. present | |
| 8 | 64/17/19 | 2.2–4.4–0–.70 | Clear liquid | 7.60 |
| 9 | 61/18/21 | 2.2–4.1–0–.74 | Clear liquid | 7.15 |
| 10 | 60/20/20 | 2.2–4.1–0–.83 | Clear liquid | |
| 11 | 58/20/22 | 2.2–3.9–0–.83 | Clear liquid | 8.40 |
| 12 | 55.6/16.6/27.8 | 2.4–3.8–0–.69 | Clear liquid | 8.85 |
| 13 | 5/21/24 | 2.2–3.7–0–.87 | Clear liquid | 8.55 |
| 14 | 51/23/26 | 2.3–3.5–0–.95 | Clear liquid | 8.70 |
| 15 | 50/30/20 | 2.0–3.4–0–1.24 | Ppt. present | |
| 16 | 50/25/25 | 2.2–3.4–0–1.03 | Clear liquid | 8.6 |
| 17 | 50/26/24 | 2.1–3.4–0–1.08 | Clear liquid | 8.5 |
| 18 | 50/27/23 | 2.1–3.4–0–1.12 | Clear liquid | 8.35 |
| 19 | 50/28/22 | 2 – 3.4–0–1.16 | Opaque liquid | |
| 20 | 47/25/28 | 2.3–3.2–0–1.03 | Clear liquid | 8.80 |
| 21 | 41/28/31 | 2.3–2.8–0–1.16 | Clear liquid | 8.90 |
| 22 | 40/32/28 | 2.1–2.7–0–1.32 | Ppt. present | 8.60 |
| 23 | 37/34/29 | 2.1–2.5–0–1.40 | Ppt. present | 8.75 |
| 24 | 37/30/33 | 2.3–2.5–0–1.24 | Ppt. present | 9.00 |
| 25 | 35/28/37 | 2.5–2.4–0–1.16 | Clear liquid | 9.10 |
| 26 | 34/32/34 | 2.3–2.3–0–1.32 | Ppt. present | 9.00 |
| 27 | 34/31/35 | 2.4–2.3–0–1.28 | Ppt. present | 9.10 |
| 28 | 33/27/40 | 2.6–2.2–0–1.11 | Clear liquid | 9.20 |
| 29 | 32/30/38 | 2.5–2.2–0—1.24 | Ppt. present | 9.05 |
| 30 | 30/28/42 | 2.6–2.0–0–1.16 | Ppt. present | 9.20 |
| 31 | 30/30/40 | 2.5–2.0–0–1.24 | Ppt. present | |
| 32 | 30/32/38 | 2.4–2.0–0–1.32 | Ppt. present | |
| 33 | 26/35/39 | 2.4–1.8–0–1.45 | Ppt. present | 9.00 |
| 34 | 22/26/52 | 2.9–1.5–0–1.07 | Clear liquid | |
| 35 | 21/29/50 | 2.8–1.43–0–1.2 | Ppt. present | |
| 36 | 22/28/50 | 2.8–1.50–0–1.16 | Ppt. present | |
| 37 | 23/27/50 | 2.8–1.56–0–1.12 | Ppt. present | |
| 38 | 24/26/50 | 2.9–1.63–0–1.08 | Ppt. present | |
| 39 | 25/25/50 | 2.9–1.70–0–1.03 | Clear liquid | |
| 40 | 20/30/50 | 2.8–1.40–0–1.24 | Ppt. present | |
| 41 | 20/20/60 | 3.3–1.40–0–.83 | Clear liquid | |
| 42 | 16/22/62 | 3.3–1.00–0–.91 | Clear liquid | |
| 43 | 9/21/70 | 3.5–.61–0–.87 | Ppt. present | |
| 44 | 10/20/70 | 3.5–.68–0–.82 | Ppt. present | |
| 45 | 11/19/70 | 3.6–.75–0–.79 | Opaque liquid | |
| 46 | 12/18/70 | 3.6–.82–0–.75 | Opaque liquid | |
| 47 | 10/20/70 | 3.5–.68–0–.82 | Ppt. present | |
| 48 | 10/10/80 | 4 –0.7–0–.41 | Clear liquid | |
| 49 | 10/ 0/90 | 4.5– .7–0–– | Clear liquid | |
| 50 | 7/ 3/90 | 4.4– .5–0–.12 | Clear liquid | |
| 51 | 5/ 5/90 | 4.4– .3–0–.21 | Clear liquid | |
| 52 | 3/ 7/90 | 4.4– .2–0–.29 | Clear liquid | |
| 53 | 0/47/53 | 2.5–0– 0–1.94 | Ppt. present | 8.95 |

Figure 4:
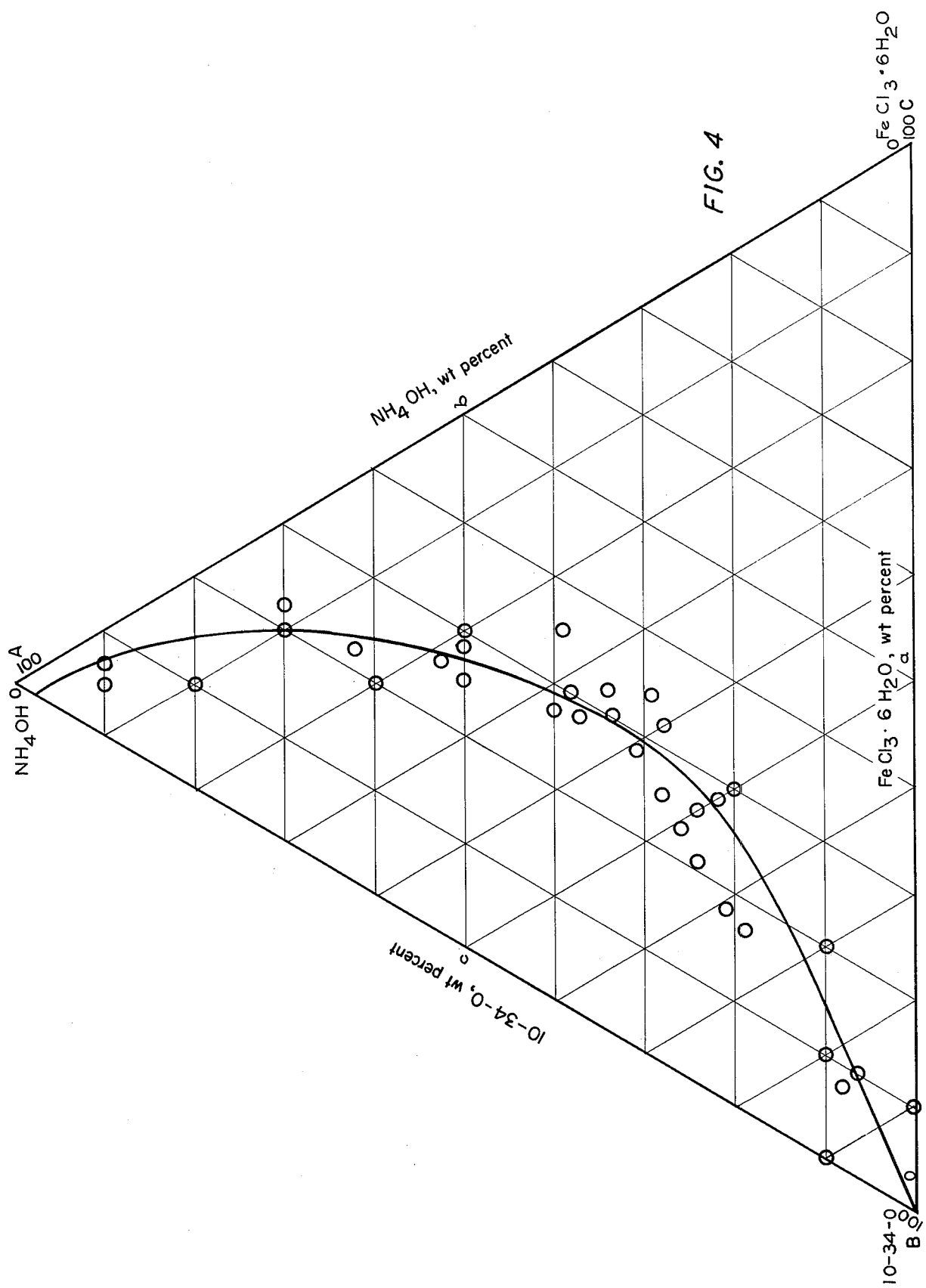
FIG. 4 is a trilinear graph of ammonium hydroxide A versus 10-34-0 versus hydrated ferric chloride C, with those compositions to the left of the semicircular plot representing those compositions which were stable and substantially solids-free.

Preparation of a Trilinear Graph Showing One Phase Area in the System 10-34-0/FeSO$_4$.7H$_2$O/HN$_4$OH These runs were made to gather solubility data on the system 10-34-0/FeSO$_4$.7H$_2$O/NH$_4$OH at room temperature (25° C.). A trilinear graph showing the area having a homogeneous liquid phase was then prepared (FIG. 4).

tion contains 0.08034 g $Fe^{+2}$. The procedure was to weigh the 10-34-0 into a screw cap vial and dilute it with the calculated amount of water. The solution was agitated to mix it. FeSO$_4$ solution was added and the mixture was agitated vigorously. Ammonium hydroxide (29 wt.% NH$_3$) was then added, the mixture was shaken vigorously, and observed. The final mixture contained 10 g H$_2$O and 10 g total of 10-34-0, FeSO$_4$.7H$_2$O, and NH$_4$OH.

TABLE V - FIG. 4

| Formulation No. | Wt. % Solid 10-34-0/FeSO$_4$.7H$_2$O/NH$_4$OH | Composition, Wt.% N-P$_2$O$_5$-K$_2$O-Fe | Comments |
|---|---|---|---|
| 1 | 2/ 4/94 | 11.35–0.34–0–0.4 | Trace precipitate |
| 2 | 4/ 4/92 | 11.20–0.68–0–0.4 | Trace ppt. |
| 3 | 6/ 4/90 | 11.05–1.02–0–0.4 | Trace ppt. |
| 4 | 6/22/72 | 8.90–1.0 –0–2.01 | Contains ppt. |
| 5 | 8/ 4/88 | 10.90–1.36–0–0.4 | Clear liquid |
| 6 | 10/10/80 | 10.05–1.70–0–1.0 | Clear liquid |
| 7 | 10/18/72 | 9.10–1.70–0–1.81 | Hazy liquid |
| 8 | 14/14/72 | 9.30–2.4 –0–1.41 | Hazy liquid |
| 9I | 30/ 8/62 | 8.9 –5.1 – 0 –0.8 | Trace crystalline ppt. |
| 10 | 30/10/60 | 8.65–5.1– 0– 1 | Trace crystalline ppt. |
| 11 | 30/12/58 | 8.45–5.1– 0–1.2 | Trace crystalline ppt. |
| 12 | 30/14/56 | 8.20–5.1– 0–1.4 | Opaque liquid |
| 13 | 42.9/14.3/42.8 | 5.1 –5.1– 0– 1 | Clear liquid, ppt. |

TABLE V - FIG. 4-continued

| Formulation No. | Wt. % Solid 10-34-0/FeSO$_4$ . 7H$_2$O/NH$_4$OH | Composition, Wt.% N-P$_2$O$_5$-K$_2$O-Fe | Comments |
| --- | --- | --- | --- |
| | | | forms on standing |
| 14 | 48.1/11.5/40.4 | 7.4–8.5– 0–1.2 | Trace crystalline ppt. |
| 15 | 50/ 8/42 | 7.5–8.5– 0–0.8 | Trace crystalline ppt. |
| 16 | 50/10/40 | 7.3–8.5– 0– 1 | Trace crystalline ppt. |
| 17 | 50/12/38 | 7.05–8.5–0–1.2 | Trace crystalline ppt. |
| 18 | 50/14/36 | 6.8–8.5-0– 1.4 | Opaque liquid |
| 19 | 60/10/30 | 6.6–10.2– 0–1 | Clear liquid |
| 20 | 66.7/8.3/25 | 6.35–11.33–0–0.84 | Clear liquid |
| 21 | 72/ 4/24 | 6.45–12.24–0–0.4 | Clear liquid |
| 22 | 72/ 6/22 | 6.25–12.24–0–0.6 | Hazy liquid |
| 23 | 72/ 8/20 | 6.00–12.24–0–0.8 | Hazy liquid |
| 24 | 80/10/10 | 5.19–13.6– 0– 1 | Ppt. present |

The following runs are typical of those employing ferric sulfate:

TABLE VI

Iron Complex Formulations Prepared from Ferric Sulfate, 10-34-0 Liquid Fertilizer, and Ammonium Hydroxide

| 10-34-0 Wt.% | Formulation Fe$_2$(SO$_4$)$_3$ . xH$_2$O Solution (% concentration) Wt. % | NH$_4$OH, Wt. % | Composition, N-P$_2$O$_5$-K$_2$O-Fe, Wt. % | Comments |
| --- | --- | --- | --- | --- |
| 66.5 | 22.3 (68.3) | 15.2 | 9–21.2–0–3.4 | Liquid |
| 56.7 | 25.9 (67) | 17.4 | 9.8–19.3–0–3.9 | Liquid |
| 35.1 | 38.6 (68.3) | 26.3 | 9.8–11.9–0–5.8 | Liquid |
| 30.7 | 43.6 (67) | 25.6 | 9.2–10.5–0–6.5 | Liquid |
| 25.7 | 43.5 (67) | 30.8 | 9.9–8.7–0–6.5 | Liquid |
| 24.6 | 45.6 (67) | 29.7 | 9.6–8.4–0–6.8 | Liquid |
| 23.5 | 48.8 (67) | 27.7 | 9.0–8.0–0–7.3 | Viscous gel |
| 66.0 | 17.0 (100) | 17.0 | 10.7–22.4–0–3.8 | Liquid + solid |
| 40.0 | 29.0 (100) | 31.0 | 11.4–13.6–0–6.4 | Liquid |
| 29.0 | 36.0 (100) | 35.0 | 11.3–9.9–0–8.0 | Liquid + solid |
| 28.0 | 39.0 (100) | 33.0 | 10.7–9.5–0–8.7 | Solid gel |

Figure 5:
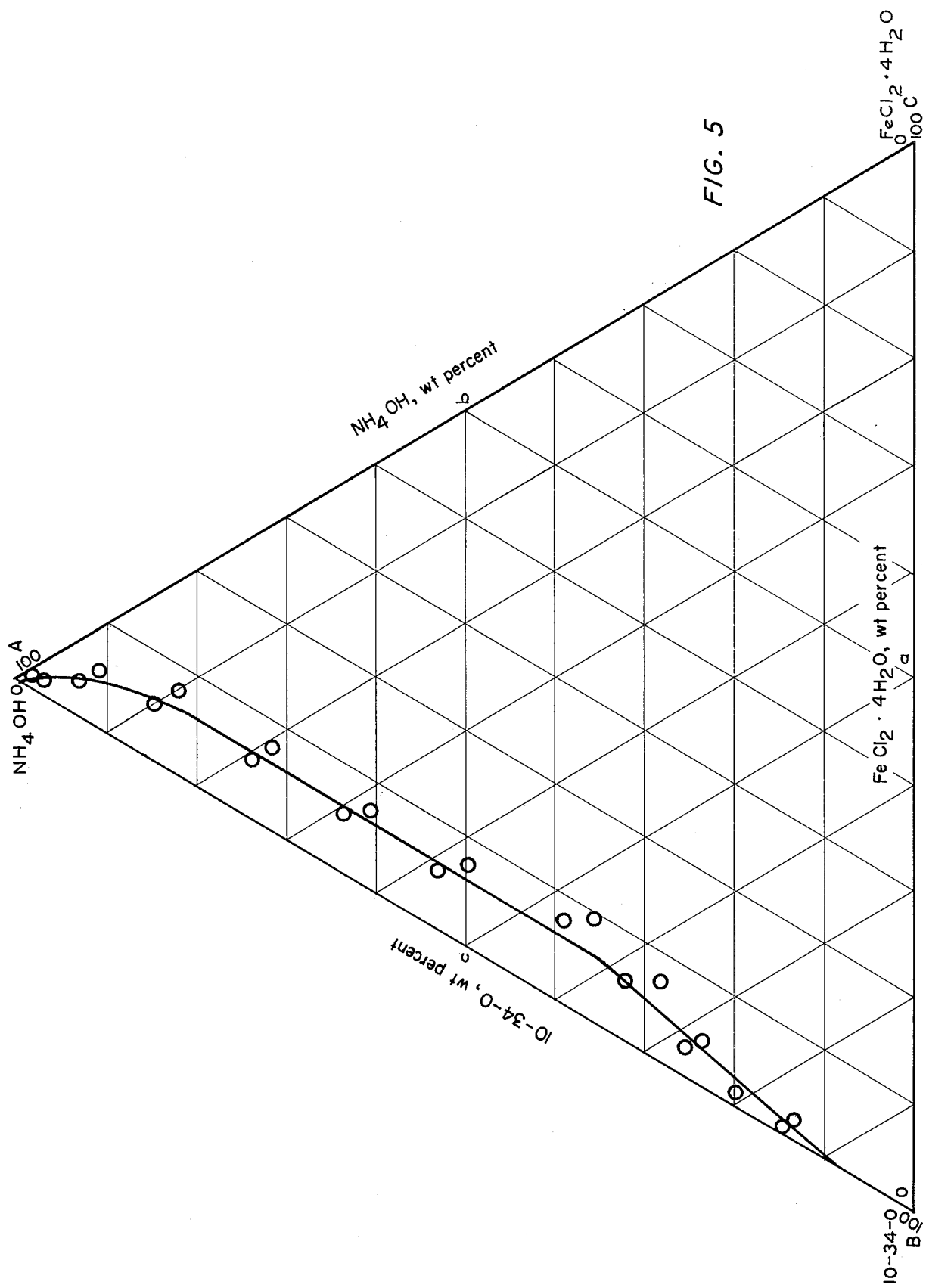
FIG. 5 is a trilinear graph of ammonium hydroxide A versus 10-34-0 B versus hydrated ferrous chloride C, with those compositions to the left of the semicircular line representing compositions which were stable and substantially solids-free.

Preparation of Solution Iron Complexes in Systems 10-34-0, Fe$_2$(SO$_4$)$_3$.xH$_2$O, NH$_4$OH These runs were made to determine the formulations that were homogeneous at room temperature (25° C). A trilinear graph was prepared (FIG. 5).

The procedure was to weigh the 10-34-0 into a screw cap vial. The 50 weight percent Fe$_2$(SO$_4$)$_3$.xH$_2$O solution was weighed into the vial and thoroughly mixed by stirring. Ammonium hydroxide (29 Wt. % NH$_3$) was added and the mixture was vigorously shaken to mix. The samples were then observed.

TABLE VII - FIG. 5

| Formulation No. | Wt. % Solid 10-34-0/Fe$_2$(SO$_4$)$_3$ . xH$_2$O/NH$_4$OH | Composition, Wt. % N-P$_2$O$_5$-K$_2$O-Fe | Comments |
| --- | --- | --- | --- |
| 1 | 58/24/18 | 8.15–15.89–0–4.27 | Contains ppt. |
| 2 | 58/22/20 | 8.69–16.15–0–4.02 | Ppt.-free |
| 3 | 58/20/22 | 9.25–16.42–0–3.67 | Ppt.-free |
| 4 | 58/18/24 | 9.75–16.69–0–3.39 | Contains ppt. |
| 5 | 58/16/26 | 10.34–16.98–0–3.10 | Contains ppt. |
| 6 | 58/14/28 | 10.96–17.28–0–2.72 | Contains ppt. |
| 7 | 60/23/17 | 8.21–16.59–0–4.15 | Contains ppt. |
| 8 | 60/21/19 | 8.68–16.86–0–3.88 | Ppt.-free |
| 9 | 60/19/21 | 9.24–17.14–0–3.53 | Ppt.-free |
| 10 | 60/17/23 | 9.83–17.44–0–3.25 | Contains ppt. |
| 11 | 60/15/25 | 10.43–17.74–0–2.87 | Contains ppt. |
| 12 | 60/13/27 | 10.97–18.05–0–2.57 | Contains ppt. |
| 13 | 62/22/16 | 8.20–17.30–0–4.02 | Contains ppt. |
| 14 | 62/20/18 | 8.75–17.58–0–3.67 | Ppt.-free |
| 15 | 62/18/20 | 9.32–17.88–0–3.39 | Ppt.-free |
| 16 | 62/12/22 | 9.91–18.19–0–3.10 | Contains ppt. |
| 17 | 62/14/24 | 10.43–18.51–0–2.72 | Contains ppt. |
| 18 | 62/12/26 | 11.07–18.84–0–2.41 | Contains ppt. |
| 19 | 64/21/15 | 8.26–18.02–0–3.88 | Contains ppt. |
| 20 | 64/19/17 | 8.82–18.32–0–3.53 | Ppt.-free |
| 21 | 64/17/19 | 9.32–18.63–0–3.25 | Ppt.-free |
| 22 | 64/15/21 | 9.91–18.96–0–2.87 | Ppt.-free |
| 23 | 64/13/23 | 10.53–19.29–0–2.57 | Contains ppt. |
| 24 | 64/11/25 | 11.17–19.64–0–2.16 | Contains ppt. |
| 25 | 46/30/24 | 7.92–12.0–0–5.15 | Ppt.-free |
| 26 | 46/28/26 | 8.44–12.19–0–4.84 | Ppt.-free |
| 27 | 46/26/28 | 4.97–12.38–0–4.60 | Ppt.-free |
| 28 | 46/24/30 | 9.52–12.58–0–4.27 | Trace ppt. |
| 29 | 46/22/32 | 10.0–12.79–0–4.02 | Contains ppt. |
| 30 | 44/31/25 | 7.94–11.45–0–5.27 | Ppt.-free |
| 31 | 44/29/27 | 8.37–11.63–0–4.96 | Ppt.-free |
| 32 | 44/27/29 | 8.90–11.81–0–4.72 | Ppt.-free |
| 33 | 44/25/31 | 9.44–12.00–0–4.48 | Ppt.-free |
| 34 | 44/23/33 | 10.0–12.00–0–4.15 | Contains ppt. |

TABLE VII - FIG. 5-continued

| Formulation No. | Wt. % Solid 10-34-0/Fe$_2$(SO$_4$)$_3$ . xH$_2$O/NH$_4$OH | Composition, Wt. % N-P$_2$O$_5$-K$_2$O-Fe | Comments |
|---|---|---|---|
| 35 | 42/32/26 | 7.88-10.83-0-5.38 | Contains gel |
| 36 | 42/30/28 | 8.38-11.00-0-5.15 | Ppt.-free |
| 37 | 2/28/30 | 8.91-11.17-0-4.84 | Ppt.-free |
| 38 | 42/26/32 | 9.37-11.35-0-4.60 | Ppt.-free |
| 39 | 42/24/34 | 9.92-11.53-0-4.27 | Ppt.-free |
| 40 | 40/33/27 | 7.82-10.23-0-5.49 | Ppt.-free |
| 41 | 40/31/29 | 8.32-10.38-0-5.27 | Ppt.-free |
| 42 | 40/29/31 | 8.84-10.54-0-4.96 | Ppt.-free |
| 43 | 40/27/33 | 9.37-10.71-0-4.72 | Ppt.-free |
| 44 | 40/25/35 | 9.92-10.88-0-4.48 | Ppt.-free |
| 45 | 38/34/28 | 7.84-9.63-0-5.60 | Ppt.-free |
| 46 | 38/32/30 | 8.33-9.77-0-5.38 | Ppt.-free |
| 47 | 38/30/32 | 8.77-9.92-0-5.15 | Ppt.-free |
| 48 | 38/28/34 | 9.30-10.08-0-4.84 | Ppt.-free |
| 49 | 38/26/36 | 9.84-10.24-0-4.60 | Ppt.-free |
| 50 | 36/35/29 | 7.77-9.04-0-5.78 | Contains gel |
| 51 | 36/33/31 | 8.27-9.17-0-5.49 | Ppt.-free |
| 52 | 36/31/33 | 8.78-9.31-0-5.27 | Ppt.-free |
| 53 | 36/29/35 | 9.30-9.46-0-4.96 | Ppt.-free |
| 54 | 36/27/37 | 9.76-9.61-0-4.72 | Ppt.-free |
| 55 | 34/36/30 | 7.79-8.53-0-5.88 | Ppt.-free |
| 56 | 34/34/32 | 8.21-8.66-0-5.60 | Ppt.-free |
| 57 | 34/32/34 | 8.71-8.79-0-5.38 | Ppt.-free |
| 58 | 34/30/36 | 9.23-8.92-0-5.15 | Ppt.-free |
| 59 | 34/28/38 | 9.77-9.06-0-4.84 | Ppt.-free |
| 60 | 32/37/31 | 7.74-7.96-0-5.99 | Contains gel |
| 61 | 32/35/33 | 8.15-8.07-0-5.78 | Contains gel |
| 62 | 32/33/35 | 8.72-8.20-0-5.49 | Ppt.-free |
| 63 | 32/31/37 | 9.16-8.32-0-5.27 | Ppt.-free |
| 64 | 32/29/39 | 9.69-8.45-0-4.96 | Ppt.-free |
| 65 | 30/38/32 | 7.68-7.39-0-6.09 | Contains ppt. |
| 66 | 30/36/34 | 8.16-7.50-0-5.88 | Contains ppt. |
| 67 | 30/34/36 | 8.66-7.61-0-5.60 | Ppt.-free |
| 68 | 30/32/38 | 9.17-7.73-0-5.38 | Ppt.-free |
| 69 | 30/30/40 | 9.69-7.85-0-5.15 | Ppt.-free |
| 70 | 28/39/33 | 7.70-6.83-0-6.26 | Solid gel |
| 71 | 28/37/35 | 8.18-6.93-0-5.99 | Contains gel |
| 72 | 28/35/37 | 8.59-7.04-0-5.78 | Contains gel |
| 73 | 28/33/39 | 9.10-7.14-0-5.49 | Ppt.-free |
| 74 | 28/31/41 | 9.62-7.25-0-5.19 | Ppt.-free |
| 75 | 26/40/34 | 7.64-6.29-0-6.36 | Contains gel |
| 76 | 26/38/36 | 8.12-6.38-0-6.09 | Contains gel |
| 77 | 26/36/38 | 8.60-6.47-0-5.88 | Contains gel |
| 78 | 26/34/40 | 9.10-6.57-0-5.60 | Contains gel |
| 79 | 26/32/42 | 9.55-6.67-0-5.38 | Contains gel |
| 80 | 46/32/22 | 7.50-11.82-0-5.38 | Solid gel |
| 81 | 44/33/23 | 7.44-11.28-0-5.49 | Solid gel |
| 82 | 42/34/24 | 7.39-10.67-0-5.60 | Solid gel |
| 83 | 40/35/25 | 7.41-10.07-0-5.78 | Solid gel |
| 84 | 38/36/27 | 7.35-9.49-0-5.88 | Solid gel |
| 85 | 36/37/27 | 7.30-8.91-0-5.99 | Solid gel |
| 86 | 34/38/28 | 7.25-8.41-0-6.09 | Solid gel |
| 87 | 24/36/40 | 8.82-6.03-0-5.88 | Gelled |
| 88 | 24/34/42 | 9.25-6.12-0-5.60 | Solid gel |
| 89 | 40/23/37 | 10.41-11.06-0-4.15 | Contains solid |
| 90 | 38/24/38 | 10.40-10.40-0-4.27 | Contains solid |
| 91 | 36/25/39 | 10.32-9.76-0-4.48 | Contains some crystals |
| 92 | 34/26/40 | 10.32-9.21-0-4.60 | Contains trace of solid |
| 93 | 32/27/41 | 10.24-8.58-0-4.72 | Ppt.-free |
| 94 | 30/28/42 | 10.16-7.97-0-4.84 | Trace of solid |
| 95 | 28/29/43 | 10.16-7.36-0-4.96 | Contains solid |

EXAMPLE II

To demonstrate that a solubilized iron complex in accordance with my invention also can be prepared incorporating potassium, a run was made in which 7.33 grams of an aqueous solution of potassium monobasic orthophosphate (1.33 g KH$_2$PO$_4$ dissolved in 6 g of deionized water) was added to 10 g of soluble iron complex of a composition of 9.23-9.87-0-6.15 Fe-5.29 S. The stable, solid-free solution contained 2.65 weight percent K$_2$O, and had a final composition of 5.33-5.12-2.65-3.55 Fe-3.05 S.

EXAMPLE III

The stability of the soluble iron complexes were tested under various storage conditions. It was found that a small amount of precipitate frequently was present in samples of the soluble iron complex as that had aged at room temperature for several months. All had been prepared with a commercial 10-34-0. Similar precipitate in similar amounts also slowly formed, however, in commerical 10-34-0 liquid fertilizer alone (not containing any complexed iron) which had been prepared from wet process phosphoric acid. The precipitate was determined to be forming as a result of trace amounts of metallic impurities originally present in the phosphate rock. Since 10-34-0 commercial liquid fertilizer was used to prepare my soluble iron complexes, it was not surprising that traces of precipitate formed in the aged product. The precipitate was identified as (Mg, Mn, Fe, Ca)NH$_4$PO$_4$.6H$_2$O wherein the various metals randomly occupied a lattice site.

Other samples of my high nitrogen, high phosphorus iron complexes were aged at temperatures of −6° F., 36° F., 43° F., and 100° F. Crystals of apparently diammonium orthophosphate did form in the sample stored at −6° F., but quickly dissolved when the sample was removed from the freezer and restored to room temperature. The sample stored at 100° F. gelled after about 2 weeks because ammonia was slowly lost from the system, but quickly reliquefied when ammonia was readded. Since ammonia is an integral part of the iron complex, this run shows the importance of keeping containers of the stabilized product suitably sealed.

EXAMPLE IV

Testing of Soluble Iron Complex

After I developed my stable soluble iron complexes, a series of tests were run to demonstrate its effects on growing plants. The first step was to determine if the iron remained in a useable form when applied to the soil.

An iron deficient soil (0.28 ppm Fe) was treated with my soluble iron complex at a rate equivalent to 3.7 ppm iron (7.4 pounds/acre). A sample of this treated soil was analyzed immediately and it contained 3.2 ppm of "available iron." This decreased to 2.3 ppm after aging 3 days, and to 1.6 ppm after 7 days (FIG. 6). While these results might appear to suggest that the iron complex was partially converted to an insoluble material and might not be fully effective for correcting a soil iron deficiency, the actual growing tests proved that my iron complexes are highly effective in correcting iron deficiencies.

Another sample of iron deficient soil was treated with about four times as much iron complex as before (14.7 ppm Fe or 29.4 lb Fe/acre). This run was made to determine if the treated soil contained a larger amount of "available iron" after aging than the prior test. A sample of this treated soil was analyzed immediately and it contained 7.6 ppm of "available iron." This decreased to 3.1 ppm after 3 days, and to 2.4 ppm after 7 days (FIG. 6). Thus, there was not much more "available iron" in this run than was present in the soil treated with one-quarter as much iron complex. These results suggest that there is an equilibrium distribution of the soluble iron complex between the analytical chelate extracting solution and the soil. Perhaps the term "available iron" is a misnomer because it may not be an actual measure of the true iron available to a growing plant.

Another series of experiments was made in which my soluble iron complex, two commercially available iron chelates, and a solution of ferrous sulfate were used to treat samples of iron deficient soil. The objective was to compare the amount of "avaialable iron" from the various sources versus the age of the treated soil sample. Approximately 80% of the applied iron in a Sequestrene 138 Fe chelate treated soil sample was still available after about three weeks compared to only 12 to 30% of the iron in the other treated soil samples. These results suggest that my soluble iron complex is about comparable to ferrous sulfate for correcting a soil iron deficiency; however, plant growth studies showed that my complex actually gives results very comparable to those obtained when using the highly expensive Sequestrene 138 Fe chelate.

EXAMPLE V

Several runs were made employing ammonium orthophosphate solutions rather than polyphosphate, otherwise employing the recommended ratios of P:Fe, $NH_3$:Fe, and the like. However, stable solubilized-iron solutions could not be obtained.

The disclosure, including data, has illustrated the value and effectiveness of my invention. The examples, the knowledge and background of the field of the invention and of general principles of chemistry and other applicable sciences have formed the bases from which the broad descriptions of the invention including the ranges of conditions and generic groups of operant components have been developed, and have formed the bases for my claims here appended.

I claim:

1. Substantially stable iron complexes comprising nitrogen, phosphorus, and iron, prepared by a process which comprises the step of:
   a. contacting a water-soluble iron salt with an ammonium polyphosphate and water in a ratio sufficient to provide at least about 1:1 phosphorus atoms:iron atoms, thereby preparing an iron polyphosphate slurry, wherein said ammonium polyphosphate contains at least about 20 weight percent of the phosphorus atoms thereof in the poly form, and
   b. thereafter reacting said iron polyphosphate slurry from said step (a) with ammonia in amount sufficient to provide a substantially stable iron complex solution.

2. The product by the process according to claim 1 wherein said substantially stable iron complex solution from said step (a) is subsequently diluted with additional aqueous ammonium polyphosphate.

3. The product by the process according to claim 1 wherein said ratio in step (a) is in the range of about 1:1 to 100:1 P atoms:Fe atoms.

4. The product by the process according to claim 3 wherein said ammonium polyphosphate contains at least about 35 weight percent of its phosphorus as a polyphosphate.

5. The product by the process according to claim 4 wherein said water-soluble iron salt is ferrous acetate, ferrous bromide, ferric bromide, ferrous chloride, ferric chloride, ferric formate, ferrous iodide, ferric lactate, ferric malate, ferrous nitrate, ferric nitrate, ferric oxalate, ferric sulfate, ferrous sulfate, or ferrous thiosulfate.

6. The product by the process according to claim 5 wherein in said ammonium polyphosphate at least about 45 weight percent of the total phosphorus is in the form of polyphosphate, said number ratio of ammonia molecules to iron atoms in said step (b) is in the range of about 3.5:1 to 30:1, and said water-soluble iron salt is ferrous chloride, ferric chloride, ferrous sulfate, or ferric sulfate.

7. The product by the process according to claim 6 wherein said ammonium polyphosphate is a high N-high $P_2O_5$ material containing about 9 to 11 weight percent N and 30 to 37 weight percent $P_2O_5$.

8. The product by the process according to claim 7 wherein said ammonium polyphosphate is a 10-34-0, and said water-soluble iron salt is ferrous chloride.

9. The product by the process according to claim 7 wherein said ammonium polyphosphate is a 10-34-O, and said water-soluble iron salt is ferric chloride.

10. The product by the process according to claim 7 wherein said ammonium polyphosphate is a 10-34-0, and said water-soluble iron salt is ferrous sulfate.

11. The product by the process according to claim 7 wherein said ammonium polyphosphate is a 10-34-0, and said water-soluble iron salt is ferric sulfate.

12. The stabilized iron complex solution as defined by FIG. 2 prepared by the process of claim 1.

13. The stabilized iron complex solution as defined by FIG. 3 prepared by the process of claim 1.

14. The stabilized iron complex solution as defined by FIG. 4 prepared by the process of claim 1.

15. The stabilized iron complex solution as defined by FIG. 5 prepared by the process of claim 1.

* * * * *

UNITED STATES PATENT AND TRADEMARK OFFICE
CERTIFICATE OF CORRECTION

PATENT NO. : 4,056,381

DATED : Nov. 1, 1977

INVENTOR(S) : Joseph R. Kenton

It is certified that error appears in the above–identified patent and that said Letters Patent are hereby corrected as shown below:

Col. 7, in TABLE I, under the "Phase Diagram" column,
"FIG. 2" should be --- FIG. 5 ---;
"3" should be --- 4 ---;
"4" should be --- 3 ---;
"5" should be --- 2 ---.

Col. 7, line 61 "(FIG. 2)" should be --- (FIG. 5) ---.

Col. 8, line 3 in the heading on Table II, "FIG. 2" should be --- FIG. 5 ---;
line 58 "(FIG. 3)" should be --- (FIG. 4) ---.

Col. 9, line 3 in the heading for Table IV, "FIG. 3" should be --- FIG. 4 ---;
line 53 "(FIG. 4)" should be --- (FIG. 3) ---.

UNITED STATES PATENT AND TRADEMARK OFFICE
CERTIFICATE OF CORRECTION

PATENT NO. : 4,056,381

DATED : Nov. 1, 1977

INVENTOR(S) : Joseph R. Kenton

It is certified that error appears in the above-identified patent and that said Letters Patent are hereby corrected as shown below:

Col. 10, line 55 in the heading of Table V, "FIG. 4" should be --- FIG. 3 ---.

Col. 11, line 1 in the heading of Table V, "FIG. 4" should be --- FIG. 3 ---;
line 39 "FIG. 5" should be --- FIG. 2 ---.

Col. 12, in the heading on TABLE VII "FIG. 5" should be --- FIG. 2 ---.

Col. 13, line 1 in the heading of Table VII "FIG. 5" should be --- FIG. 2 ---.

Signed and Sealed this

Twenty-fourth Day of June 1980

[SEAL]

Attest:

SIDNEY A. DIAMOND

Attesting Officer  Commissioner of Patents and Trademarks